United States Patent [19]
Otobe

[11] Patent Number: 4,665,882
[45] Date of Patent: May 19, 1987

[54] METHOD OF CONTROLLING AN EXHAUST GAS RECIRCULATING VALVE IN AN INTERNAL COMBUSTION ENGINE

[75] Inventor: Yutaka Otobe, Shiki, Japan

[73] Assignee: Honda Giken Kogyo K.K., Tokyo, Japan

[21] Appl. No.: 775,134

[22] Filed: Sep. 12, 1985

[30] Foreign Application Priority Data

Sep. 13, 1984 [JP] Japan .................... 59-190640

[51] Int. Cl.⁴ .......................................... F02M 25/06
[52] U.S. Cl. ................................................ 123/571
[58] Field of Search ................... 123/568, 571; 60/278

[56] References Cited

U.S. PATENT DOCUMENTS 4,378,776 4/1983 Nishimori ........................... 123/571
4,428,355 1/1984 Yokooku ............................. 123/571
4,442,820 4/1984 Ina et al. ............................. 123/571
4,448,177 5/1984 Hasegawa et al. .................. 123/571
4,541,398 9/1985 Kishi .................................... 123/571

FOREIGN PATENT DOCUMENTS 0123345 9/1980 Japan .

Primary Examiner—Willis R. Wolfe, Jr.
Attorney, Agent, or Firm—Arthur L. Lessler

[57] ABSTRACT

A method of controlling an exhaust gas recirculating quantity in an internal combustion engine, which is adapted to detect, by a valve opening sensor, actual valve opening of an exhaust gas recirculating valve arranged across an exhaust gas recirculating passageway communicating the exhaust passage of the engine with the intake passage of same, calculate the difference between the detected actual valve opening value and a desired valve opening value set in response to operating conditions of the engine, and actuate the exhaust gas recirculating valve to close or open by operating a valve actuator so as to minimize the difference. When a time interval at which the sign of the difference between the actual valve opening value and the desired valve opening value has been inverted exceeds a predetermined period of time, it is determined that the exhaust gas recirculation control system including the valve opening sensor has developed an abnormality. Preferably, the exhaust gas recirculation control system is determined to be abnormal when the number of times of inversion of the sign of the difference between the actual valve opening value and the desired valve opening value does not reach a predetermined number of times within a predetermined period of time.

14 Claims, 6 Drawing Figures

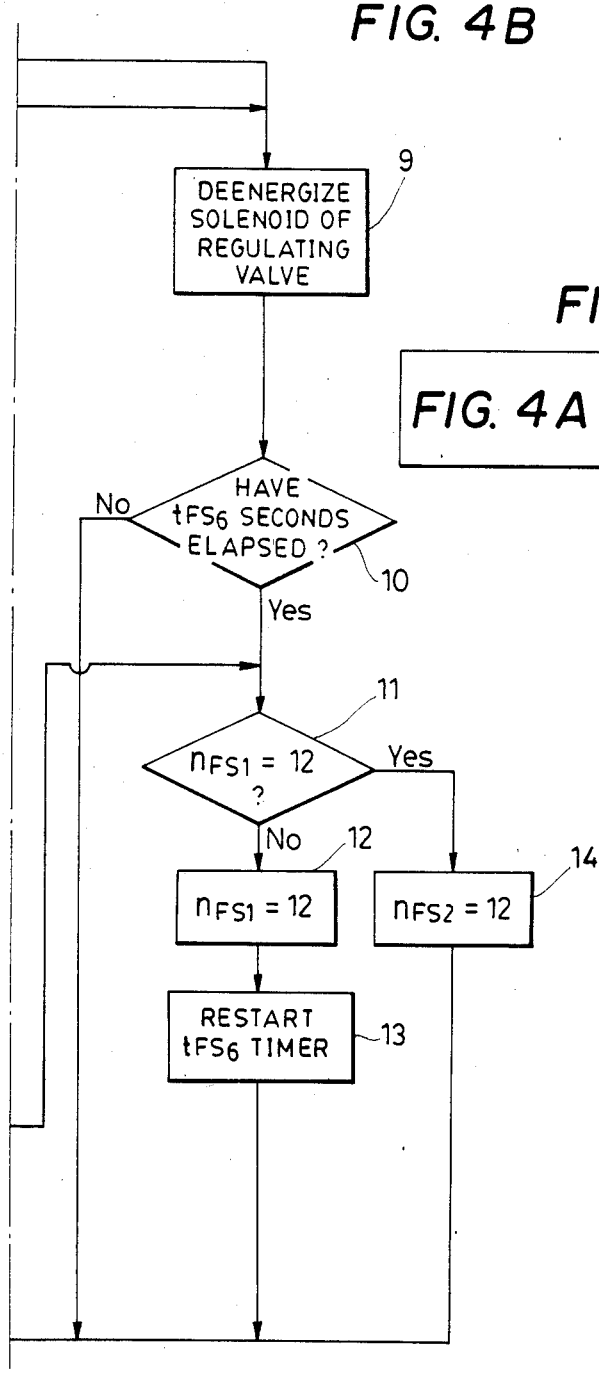

METHOD OF CONTROLLING AN EXHAUST GAS RECIRCULATING VALVE IN AN INTERNAL COMBUSTION ENGINE

BACKGROUND OF THE INVENTION

This invention relates to a method of controlling an exhaust gas recirculating valve in an internal combustion engine, and more particularly to a method of this kind, which is adapted to prevent making a wrong diagnosis upon detecting abnormality in a valve opening control system for the exhaust gas recirculating valve, including a sensor for detecting the valve opening thereof.

An exhaust gas recirculation method is generally known, which is adapted to recirculate part of exhaust gases from the exhaust passage of an internal combustion engine to the intake passage of the engine to thereby reduce nitrogen oxide (NOx) which is one of the detrimental gases generated from the engine. Also, in order to determine an appropriate exhaust gas recirculating quantity in response to operating conditions of the engine, an exhaust gas recirculating valve control method has been used, which is adapted to detect actual valve opening of an exhaust gas recirculating valve arranged across an exhaust gas recirculating passageway, and control the actual valve opening value so that it approaches a desired valve opening value set in response to operating conditions of the engine.

In such an exhaust gas recirculating valve control method as stated above, when abnormality occurs in a valve opening control system including a valve opening detecting sensor for detecting the valve opening of the exhaust gas recirculating valve, due to disconnection in the wiring, etc., it is impossible to accurately control the exhaust gas recirculating quantity, which can even cause the phenomenon that exhaust gas recirculation takes place even when it is not required, depending upon operating conditions of the engine, resulting in heavy deterioration of the engine driveability.

Therefore, it has been known to give an alarm when it is detected that the difference or the ratio between the actual valve opening value detected by the valve opening detecting sensor and the desired valve opening value falls outside an allowable range (Japanese Provisional Patent Publication (Kokai) No. 55-123345). However, if the desired valve opening value calculated in response to operating conditions of the engine exceeds a maximum possible valve opening of the exhaust gas recirculating valve, i.e., a valve opening beyond which the exhaust gas recirculating valve cannot be operated, the difference between the actual valve opening value and the desired valve opening value will not be reduced even if a control signal responsive to the difference is issued for operating the exhaust gas recirculating valve to the desired valve opening value. As a consequence, it can be wrongly judged that the exhaust gas recirculating valve has developed an abnormality. A situation similar to the above can occur if the desired valve opening value calculated in response to operating conditions of the engine exceeds a minium possible valve opening of the exhaust gas recirculating valve, resulting in a wrong judgement that the exhaust gas recirculating has developed an abnormality.

SUMMARY OF THE INVENTION

It is an object of the invention to provide a method of controlling an exhaust gas recirculating valve in an internal combustion engine, which is capable of accurately detecting abnormality in the exhaust gas recirculating valve control system of the engine without making a wrong diagnosis.

According to the present invention, there is provided a method of controlling an exhaust gas recirculating quantity in an internal combustion engine having an exhaust passage, an intake passage, and an exhaust gas recirculation control system comprising an exhaust gas recirculating passageway communicating the exhaust passage with the intake passage, an exhaust gas recirculating valve arranged across the exhaust gas recirculating passageway for regulating the quantity of exhaust gases recirculated from the exhaust passage to the intake passage, a valve actuator means for actuating the exhaust gas recirculating valve to open or close, and sensor means for detecting actual valve opening of the exhaust gas recirculating valve. The method is adapted to set a desired valve opening value of the exhaust gas recirculating valve in response to operating conditions of the engine, calculate the difference between the actual valve opening value detected by the valve opening detecting means and the desired valve opening value, and operate the valve actuator means so as to minimize the difference.

The method is characterized by comprising the following steps: (1) detecting a time interval at which the sign of the difference between the actual valve opening value detected by the valve opening sensor means and the desired valve opening value has been inverted; and (2) determining that the exhaust gas recirculation control system has developed an abnormality, if the time interval detected at the step (1) exceeds a predetermined period of time.

According to another embodiment of the invention, the method is characterized by comprising the following steps: (1) detecting the number of times the sign of the difference between the actual valve opening value detected by the valve opening detecting means and the desired valve opening value has been inverted within a predetermined period of time; and (2) determining that the exhaust gas recirculation control system has developed an abnormality, if the number of times detected at the step (1) does not reach a predetermined number of times within the predetermined period of time.

Preferably, the predetermined period of time is set at a fixed value independent of operating conditions of the engine.

Preferably, execution of the steps (1) and (2) is prohibited, when the desired valve opening value is set at a value larger than an upper limit value indicative of a substantially fully opened position of the exhaust gas recirculating valve, or when the desired valve opening value is set at a value smaller than a lower limit value indicative of a substantially fully closed position of the exhaust gas recirculating valve.

Preferably, the exhaust gas recirculating valve is fully closed, when it is determined that the exhaust gas recirculation system has developed an abnormality at the step (2).

The above and other objects, features and advantages of the invention will be more apparent from the ensuing detailed description taken in conjunction with the accompanying drawings.

BRIEF DESCRIPTION OF THE DRAWINGS

FIGS. 4, 4A and 4B describe a flow chart showing a subroutine for executing fault detection according to a second embodiment of the present invention.

DETAILED DESCRIPTION

The method according to the invention will now be described in detail with reference to the drawings.

Figure 1:
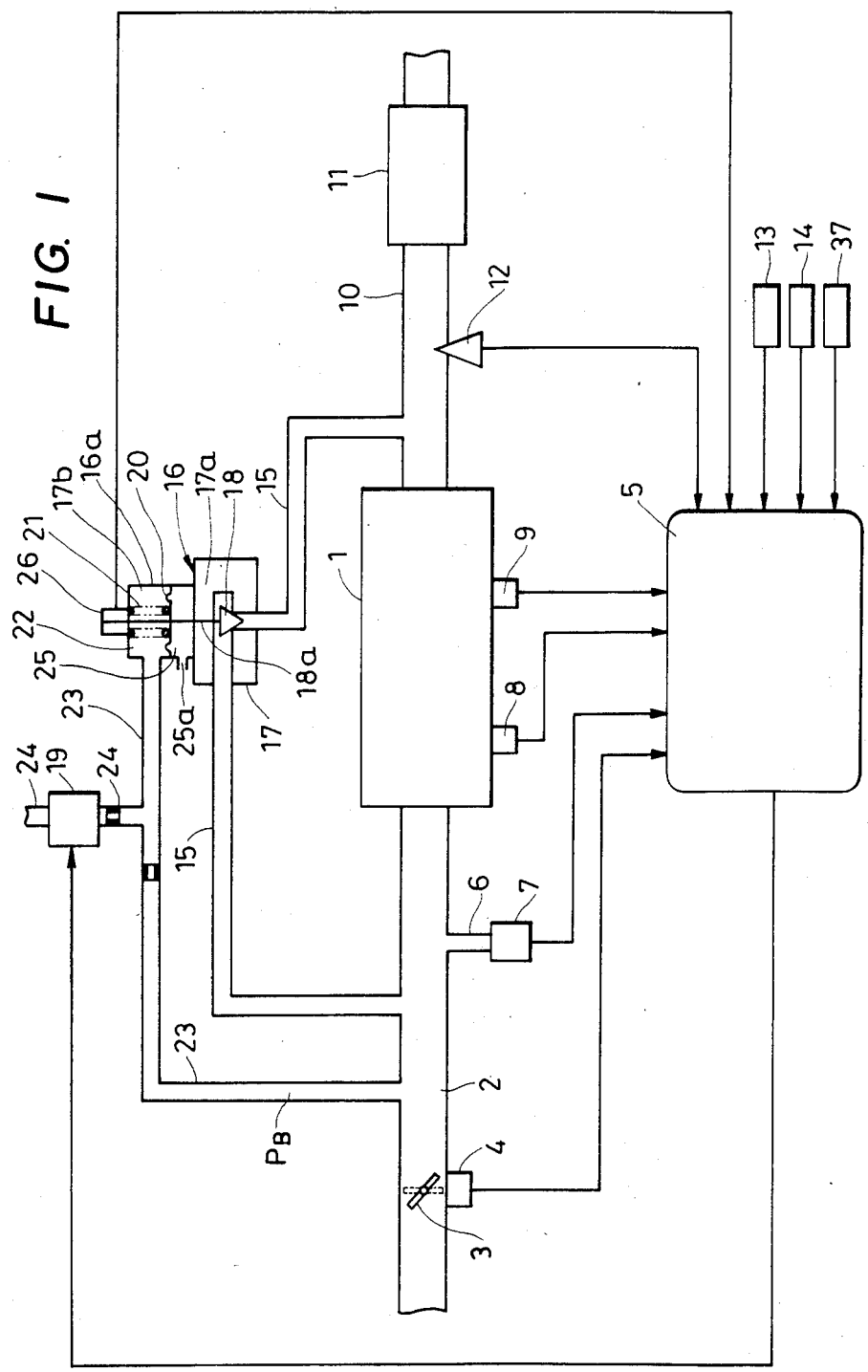
FIG. 1 is a block diagram illustrating the whole arrangement of an exhaust gas recirculation control system to which is applied the method according to the invention.

Referring first to FIG. 1, there is illustrated the whole arrangement of an exhaust gas recirculation control system in an internal combustion engine, to which the method according to the invention is applied. Reference numeral 1 designates an internal combustion engine which may be a four-cylinder type, for instance. An intake pipe (intake passage) 2 is connected to the intake ports of the engine 1, in which is arranged a throttle valve 3, which in turn is coupled to a throttle valve opening sensor (hereinafter called "the $\theta$th sensor") 4 for detecting its valve opening and converting same into an electrical signal which is supplied to an electronic control unit (hereinafter called "the ECU") 5.

On the other hand, a negative pressure sensor (hereinafter called "the PB sensor") 7 communicates through a conduit 6 with the interior of the intake pipe 2 at a location downstream of the throttle valve 3. The PB sensor 7 is adapted to detect negative pressure in the intake pipe 2 and applies an electrical signal indicative of detected intake pipe pressure PB to the ECU 5.

An engine cooling water temperature sensor (hereinafter called "the TW sensor") 8, which may be formed of a thermistor or the like, is mounted on the cylinder block of the engine 1 in a manner embedded in a cooling water jacket formed within the peripheral wall of an engine cylinder, of which an electrical output signal indicative of detected cooling water temperature is supplied to the ECU 5.

An engine rotational speed sensor (hereinafter called "the Ne sensor") 9 is arranged in facing relation to a camshaft, not shown, of the engine 1 or a crankshaft of same, not shown. The Ne sensor 9 is adapted to generate one pulse at one of particular crank angles of the engine each time the engine crankshaft rotates through 180 degrees, i.e., a pulse of a top-dead-center position (TDC) signal. Pulses generated by the Ne sensor 9 are supplied to the ECU 5.

A catalyst converter (three-way catalyst) 11 is arranged in an exhaust pipe (exhaust passage) 10 connected to exhaust ports of the engine 1 for purifying ingredients HC (hydrocarbon), CO (carbon monoxide) and NOx contained in the exhaust gases.

An oxygen concentration sensor (hereinafter called "the O$_2$ sensor") 12 is inserted in the exhaust pipe 10 at a location upstream of the catalyst converter 11 for detecting the concentration of oxygen in the exhaust gases and supplying an electrical signal indicative of a detected concentration value to the ECU 5.

Further connected to the ECU 5 are an atmospheric pressure sensor (hereinafter called "the PA sensor") 13 for detecting atmospheric pressure PA, a starter switch 37 of the engine 1, and an ignition switch 14 of same, respectively, for supplying the ECU 5 with an electrical signal indicative of detected atmospheric pressure, an electrical signal indicative of on and off positions of the starter switch 37, and an electrical signal indicative of on and off positions of the ignition switch 14.

An exhaust gas recirculating passageway 15 is arranged between the exhaust pipe 10 and the intake pipe 2 in the form of a bypass, and connects at one end to the exhaust pipe 10 at a location upstream of the O$_2$ sensor 12 (at a side closer to the engine 1) and at the other end to the intake pipe 2 at a location upstream of the PB sensor 7 (at a side closer to the throttle valve 3).

Across the exhaust gas recirculating passageway 15 is arranged an exhaust gas recirculating valve (hereinafter called "the EGR valve") 16. The EGR valve 16 is formed of a so-called diaphragm valve actuated by a valve actuator means 16a of the differential pressure-responsive type, and comprises a casing 17 having a valve chamber 17a and a diaphragm chamber 17b defined therein, a valve body 18 displaceably arranged in the valve chamber 17a for opening and closing the passageway 15, a diaphragm (as a pressure-responsive member) 20 coupled to the valve body 18 via a connecting rod 18a and actuatable in response to a resultant pressure formed by the negative pressure PB within the intake pipe 2 and the atmospheric pressure PA which is regulated by a resultant pressure-regulating valve 19, hereinafter described, and a spring 21 urging the diaphragm 20 in the valve closing direction. A negative pressure chamber 22 is partly defined by the diaphragm 20, which communicates with one end of a negative pressure communication passageway 23 having the other end connected to the intake pipe 2 at a location between the throttle valve 3 and the other end of the exhaust gas recirculating passageway 15, to be supplied with the intake pipe pressure PB through the negative pressure communication passageway 23. An atmospheric pressure-intake passageway 24 is joined to the communication passageway 23, across which is arranged the resultant pressure-regulating valve 19 which is formed by a normally open-type solenoid-controlled valve of which the duty ratio is controlled by the ECU 5 for regulating the resultant pressure to be supplied to the negative pressure chamber 22. The resultant pressure-regulating valve 19 is electrically connected to the ECU 5 to be supplied with driving signals from the ECU 5 for alternately opening and closing, so as to control the lifting amount of the valve body 18 of the EGR valve 16 and the moving speed thereof. An atmospheric pressure chamber 25 is defined by the diaphragm 20, which communicates directly with the atmosphere through a communication passage 25a.

A valve opening (lift) sensor (hereinafter called "the L sensor") 26 is mounted on the EGR valve 16 for detecting the operating position (lifting amount) of the valve body 18 of the EGR valve 16 and supplying an electrical signal indicative of a detected operating position of the valve body 18 to the ECU 5.

The ECU 5 determines, in a manner hereinafter described, whether there is abnormality in the output signal value from the L sensor 26, and also determines operating conditions of the engine on the basis of various operating parameter signals from the aforementioned various sensors, i.e. the $\theta$th sensor 4, the PB sensor 7, the TW sensor 8, the Ne sensor 9, the O$_2$ sensor 12, the PA sensor 13, the ignition switch 14, and the starter switch 37, and determines desired valve opening command values LCMD for the EGR valve 16, which are appropriate to the determined operating conditions of the engine, in a manner hereinafter described in detail.

There may be employed various manners in which the ECU 5 determines the desired valve opening command values LCMD. For instance, the ECU 5 may set a desired valve opening command value LCMD by reading out same which corresponds to the engine rotational speed Ne and the intake pipe pressure PB from a plurality of desired valve opening values previously stored in dependence on operating conditions of the engine.

The ECU 5 compares the thus set desired valve opening command value LCMD with an actual valve opening value LACT detected by the L sensor 26, and supplies driving signals to the resultant pressure-regulating valve 19 to actuate same so as to control the lifting amount of the EGR valve 16, so as to minimize the difference between the two values, i.e. so as for the EGR valve 16 to assume a required valve opening for obtaining an exhaust gas recirculating quantity optimal to the operating condition in which the engine is operating.

When the regulating valve 19 is energized to close the atmospheric pressure-intake passageway 24, the difference between the pressures acting upon the opposite side surfaces of the diaphragm 20 increases to cause upward displacement of the diaphragm 20 as viewed in FIG. 1, against the force of the spring 21, resulting in an increase in the opening degree of the valve body 18 of the EGR valve 16. On the other hand, when the regulating valve 19 is deenergized to open the atmospheric pressure-intake passageway 24, the difference between the pressures acting upon the opposite side surfaces of the diaphragm 20 decreases to cause downward displacement of the valve body 18 by the force of the spring 21 in the valve closing direction, resulting in a decreased valve opening of the EGR valve 16.

Figure 2:
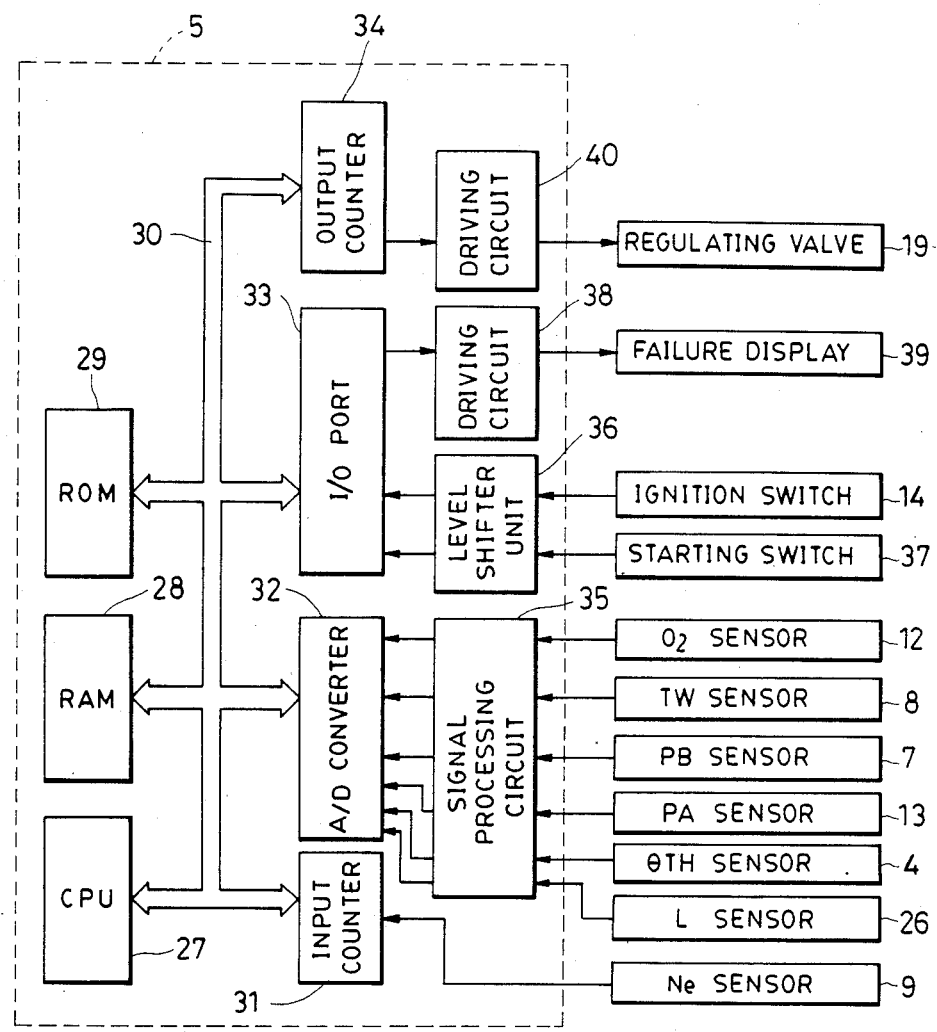
FIG. 2 is a circuit diagram showing the interior construction of the electronic control unit (ECU) in FIG. 1.

FIG. 2 shows the interior construction of the ECU 5 in FIG. 1. As shown in FIG. 2, the ECU mainly comprises a central processing unit (hereinafter called "the CPU") 27 provided with a required number of timers for fault detection, a random access memory (hereinafter called "the RAM") 28 for temporarily storing various calculated data, etc., a read-only memory (hereinafter called "the ROM") 29 storing various maps and tables for calculation of the lifting amount (desired valve opening command values LCMD) of the EGR valve 16, etc., and control programs for executing the fault detection as well as alarm and failure compensation operations, etc. The CPU 27, the RAM 28, and the ROM 29 are electrically connected with each other via a bus 30, and each electrically connected to an input counter 31, an A/D converter 32, an input-output (I/O) port 33, and an output counter 34.

The TDC signal from the Ne sensor 9 in FIG. 1 is supplied to the above input counter 31. Parameter signals from the various sensors such as the $\theta$th sensor 4, the PB sensor 7, the TW sensor 8, the $O_2$ sensor 12, the PA sensor 13, the L sensor 26, etc. as appearing in FIG. 1, are successively applied to the A/D converter 32 through a signal processing circuit 35 to be converted into respective corresponding digital signals. On-off position signals from the starter switch 37 and the ignition switch 14 are successively supplied to the input-output port 33 through a level shifter unit 36. The input-output port 33 is electrically connected to a failure display 39 through a driving circuit 38. The output counter 34 has its counting value successively set to values corresponding to the lifting amount of the EGR valve 16, calculated within the CPU 27 in synchronism with the TDC signal. A driving circuit 40 connected to the output of the output counter 34 supplies a driving signal to the resultant pressure-regulating valve 19 to energize same for a period of time corresponding to each set counting value of the output counter 34, for control of the lifting amount of the EGR valve 16 and the moving speed of same.

The CPU 27 operates to drive the failure display 39 as well as execute the failure compensation operation, when a definite determination is made that an abnormality has occurred in the valve opening control system of the EGR control valve 16.

Figure 3:
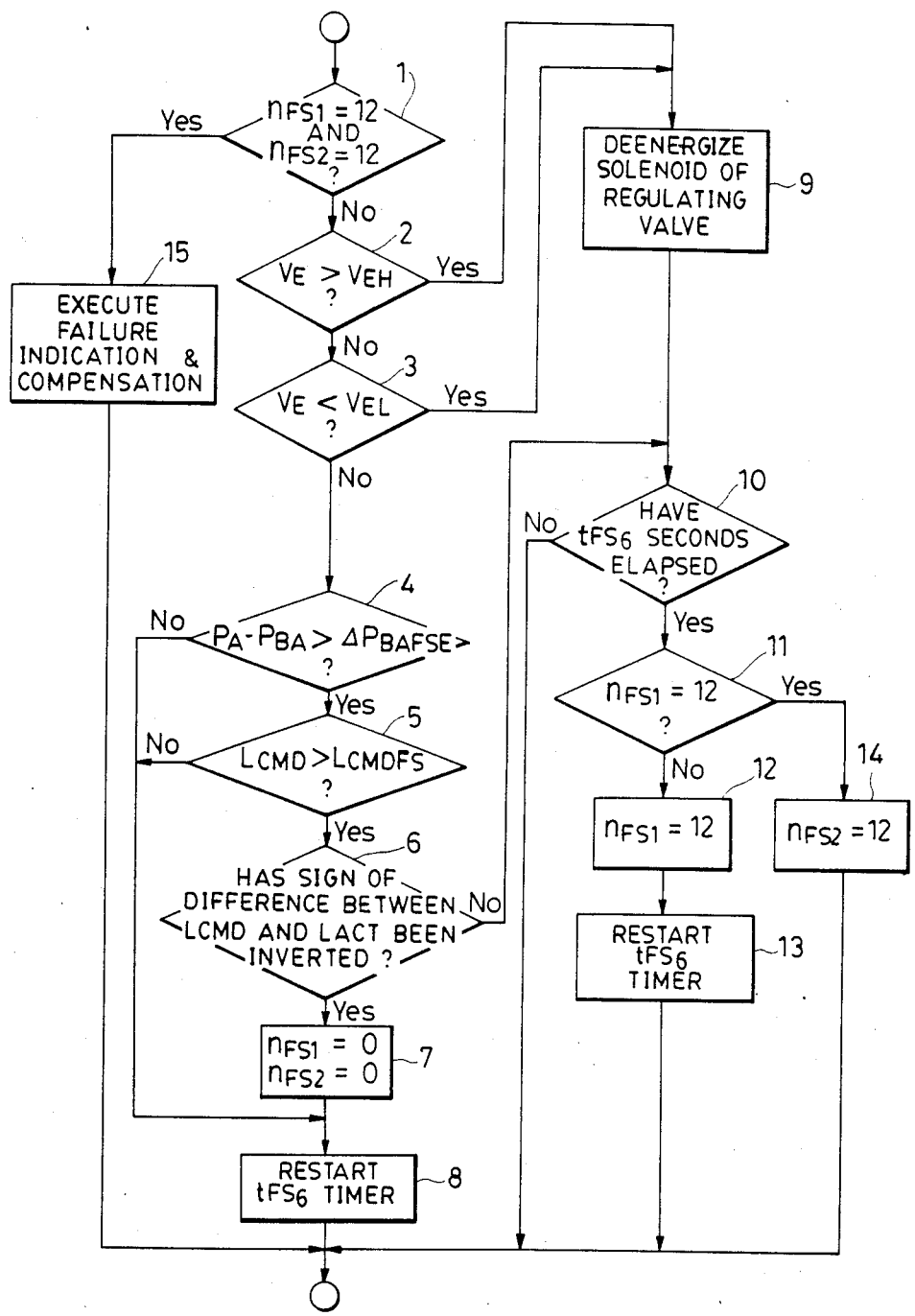
FIG. 3 is a flow chart showing a subroutine for executing fault detection according to a first embodiment of the present invention.

FIG. 3 is a flow chart illustrating a subroutine for detecting abnormality in the L sensor 26 as well as executing failure compensation for the abnormality according to the exhaust gas recirculating valve control method of the present invention, which is executed within the ECU 5 in synchronism with generation of the TDC signal. In FIG. 3, symbols nFS1 and nFS2 denote flags for failure determination or coded stored information written into the RAM 28 (in FIG. 2) at first and second predetermined address locations thereof. First, at the step 1, it is determined whether or not the first stored information nFS1 and the second stored information nFS2 are both equal to a value "12". The value "12" is a failure code which indicates that the operation of the L sensor 26 is abnormal.

If the answer to the question of the step 1 is negative (No), the program proceeds to the step 2 to determine whether or not an output voltage value VE produced by the L sensor 26 is larger than a predetermined upper limit value VEH which corresponds to an output voltage produced by the L sensor 26 when the EGR valve 16 is in a fully opened position, and has a value of, e.g. 4.9 V. If the answer to the question of the step 2 is No, that is, if a relationship of VE≦VEH is satisfied, the step 3 is executed to determine whether or not the output valtage value VE of the L sensor 26 is smaller than a predetermined lower limit value VEL which corresponds to an output voltage produced by the L sensor 26 when the EGR valve 16 is in a fully closed position, and has a value of, e.g. 0.1 V.

If either of the steps 2 and 3 renders an affirmative (Yes) decision, that is, if the output voltage value VE of the L sensor 26 falls outside its normal range (VEL - VEH), the program proceeds to the step 9 to deenergize the solenoid of the resultant pressure-regulating valve 19 to open same, so as to establish communication between the negative pressure chamber 22 of the valve actuaor means 16a, which causes downward displacement of the valve body 18 of the EGR valve 16 to block the exhuast gas recirculating passageway 15, and accordingly interruption of the exhaust gas recirculation. Then, the program proceeds to the step 10, hereinafter described.

If a No decision is rendered at the step 3, that is, if a relationship of VEL≦VE≦VEH is satisfied, the program proceeds to the step 4 to determine whether or not a difference between an atmospheric pressure value PA detected by the PA sensor 13 and an absolute pressure value PBA corresponding to an intake pipe pressure PB detected by the PB sensor 7 is larger than a predetermined reference value ΔPBAFSE. This reference value ΔPBAFSE is set at a minimum required value, e.g. 200 mmHg, for causing upward displacement of the diaphragm 20 in the valve opening direction of the EGR valve 16. If the answer to the question of the step 4 is Yes, the step 5 is executed to determine whether or not the desired valve opening command value LCMD is larger than a predetermined reference value LCMDFS. The predetermined reference value LCMDFS is set at a lower limit value indicative of a substantially fully closed position of the EGR valve, for instance, it has a value of 1 mm. If an affirmative answer is rendered at the step 5, that is, if a relationship of LCMD>LCMDFS is satisfied, the program proceeds to the step 6 wherein it is determined whether or not the sign of the difference between the desired valve opening command value LCMD and the actual valve opening value LACT detected by the L sensor 26 has been inverted from positive to negative or vice versa, that is, whether the difference has decreased or increased across zero. If the answer to the question of the step 6 is Yes, that is, if the sign of the difference between the desired valve opening command value LCMD and the actual valve opening value LACT has been inverted, it is judged that the L sensor 26 is operating normally. Then, the program proceeds to the step 7 wherein the first stored information nFS1 and the second stored information nFS2 are both cleared, followed by execution of the step 8 to restart a tFS6 timer for fault detection of the L sensor 26, to terminate the execution of the program.

If the answer to the question of the step 4 is No, that is, if a relationship of PA−PB≦ΔPBAFSE is satisfied, the program executes the step 8 to restart the tFS6 timer without executing the steps 5–7, followed by termination of the present execution of the program. This is intended to avoid making a wrong judgement that the output value of the L sensor 26 is abnormal, by executing the steps 5–7, in such an event that when the atmospheric pressure is low, even if the resultant pressure-regulating valve 19 is closed by the driving signal from the ECU 5 to introduce the intake pipe pressure PB alone into the negative pressure chamber 22, the difference between the pressures acting upon the opposite side surfaces of the diaphragm 20 is below the reference value ΔPBAFSE due to the low atmospheric pressure, failing to cause upward displacement of the diaphragm 20 in the valve opening direction of the EGR valve 16 against the urging force of the spring 21.

If the answer to the question of the step 5 is No, that is, if a relationship of LCMD≦LCMDFS is satisfied, the program proceeds to the step 8 to restart the tFS6 timer without executing steps 6–7, thereby terminating the present execution of the program without executing fault detection of the L sensor 26. By virtue of this arrangement, it is avoided to make a wrong judgement by executing the steps 6–7, when the desired valve opening command value LCMD is smaller than the predetermined reference value LCMDFS which is a lower limit value indicative of a substantially fully closed position of the EGR valve 16, and accordingly the fault detection of the operation of the L sensor 26 is difficult.

On the other hand, if a negative decision is rendered at the step 6, that is, if the sign of the difference between the desired valve opening command value LCMD and the actual valve opening value LACT has not been inverted, the program proceeds to the step 10 to determine whether or not a predetermined period of time of tFS6 seconds, e.g. 2.5 seconds, has elapsed, that is, whether or not the sign of the difference between the desired valve opening command value LCMD and the actual valve opening LACT has not been inverted within the predetermined period of time of tFS6 seconds. If the answer to the question of the step 10 is No, it is judged that the operation of the L sensor 26 is normal, followed by termination of the present execution of the program. On the other hand, if the answer to the question of the step 10 is Yes, the step 11 is executed to determine whether or not the first stored information nFS1 has the value "12". If a negative decision is rendered, the program proceeds to the step 12 to write the value "12" of the first stored information nFS1 into the RAM 28 at the first predetermined address location. That is, if the sign of the difference between the desired valve opening command value LCMD and the actual valve opening value LACT has not been inverted within the predetermined period of time of tFS6 seconds, the value "12" of the first stored information nFS1 is written into the RAM 28 as a flag for failure determination, thereby completing a first fault detection of the L sensor 26.

Then, the step 13 is executed to restart the tFS6 timer, followed by termination of the present execution of the program. Then, in the next execution of the program in synchronism with generation of a subsequent pulse of the TDC signal, if it is determined at the step 6 that the inversion of the sign of the difference between the desired valve opening value LCMD and the actual valve opening value LACT has occurred within the predetermined period of time of tFS6 seconds from the time the first fault detection was made, it is judged that there is no abnormality in the L sensor 26, as a result of execution of the steps 2–8, thereby preventing making a wrong judgement.

On the other hand, if it is determined that the predetermined period of time of tFS6 seconds has elapsed without the inversion of the sign of the difference between the desired valve opening command value LCMD and the actual valve opening value LACT from the time the first fault detection was made, the answers to the question of the steps 10 and 11 will be both affirmative. Then, at the step 14, the value "12" of the second stored information nFS2 is written into the RAM 28 at the second predetermined address location, thereby completing a second fault determination of the L sensor 26. As a result, both the first stored information nFS1 and the second stored information nFS2 have the value "12", which makes the answer to the question of the step 1 executed in the next execution of the program affirmative, that is, the L sensor 26 is definitely determined to be abnormal. Then, the program proceeds to the step 15 wherein the failure display 39 (in FIG. 2) is actuated to indicate an abnormality in the L sensor 26, and failure compensation operation is executed, e.g. the solenoid of the resultant pressure-regulating valve 19 is deenergized to open same, so that the EGR valve 16 is closed to interrupt the exhaust gas recirculation. Then, the execution of the program is terminated.

Incidentally, when the step 15 is executed, the first stored information nFS1 and second stored information nFS2 written into the RAM 28 continue to assume the value "12" until they are cleared to a value "0" when the power battery is disconnected from the ECU 5, or when the ignition switch 14 is turned off, for repair of the valve opening control system including the L sensor 26. Therefore, the execution of the step 15 is continued just before the repair is made.

Figure 4A:
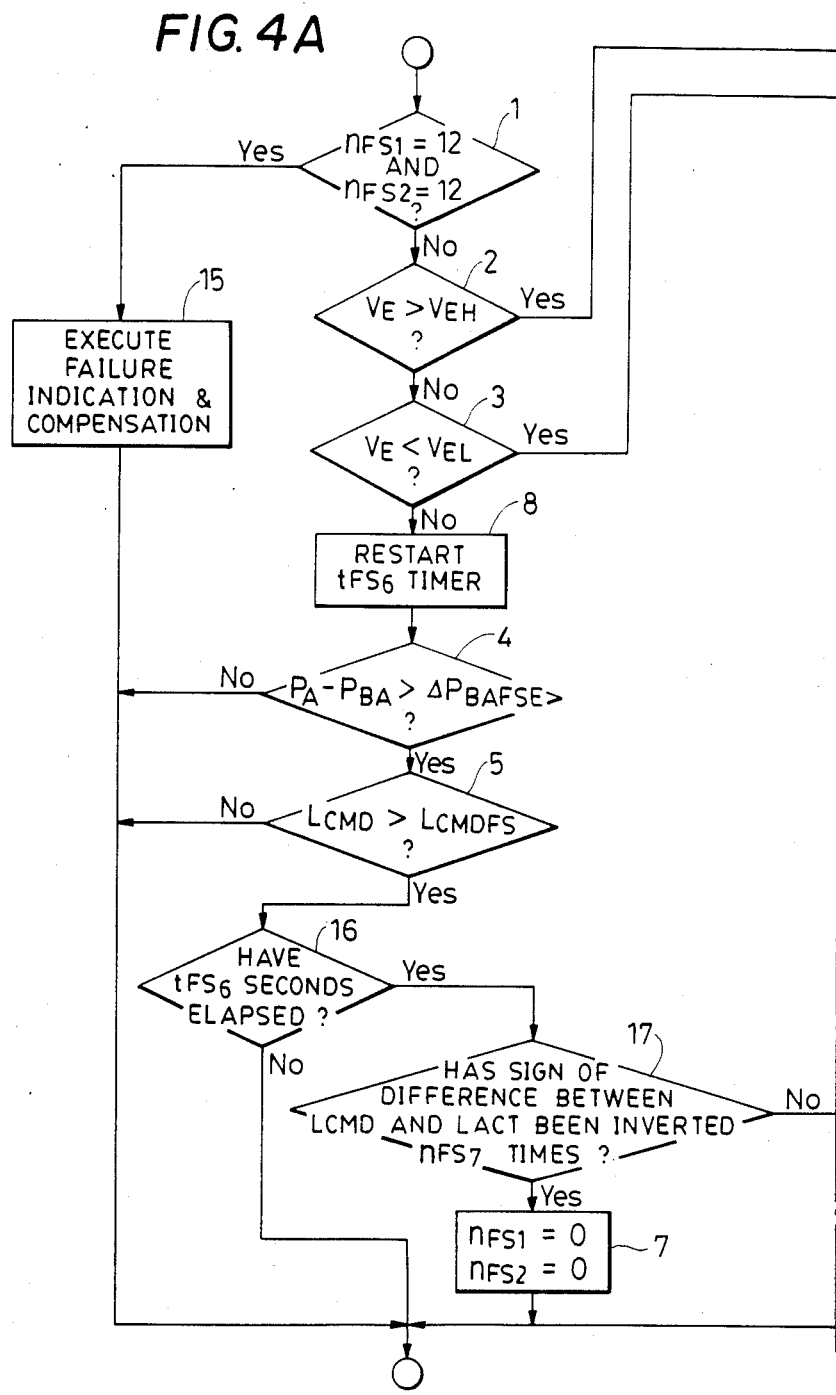

Next, a second embodiment of the invention will be described with reference to FIG. 4. FIG. 4 is a flow chart illustrating a subroutine for executing fault detection of the L sensor 26 as well as failure compensation operation, wherein identical reference numerals with those of FIG. 3 denote the identical steps, of which detailed description is omitted.

The second embodiment of FIG. 4 is distinctive from the first embodiment of FIG. 3 in that in addition to the tFS6 timer for the L sensor 26, another timer tFS7 is provided, wherein determination of an abnormality in the valve opening control system including the L sensor 26 is made when the sign of the difference between the desired valve opening command value LCMD and the actual valve opening value LACT has not been inverted a predetermined number of times within a predetermined period of time counted by the tFS7 timer.

If all the steps 1-3 render a negative answer, that is, if it is determined that the output voltage VE of the L sensor 26 is within its normal range (VEL - VEH), the step 8 is executed to restart the tFS6 timer, followed by execution of the step 4. If the answer to the question of the step 4 is No, the present execution of the program is terminated without executing the step 5 et seq., while if the answer is Yes, the step 5 is executed. If the answer to the step 5 is No, the present execution of the program is terminated without executing the step 16 et seq.

If the answer to the step 5 is Yes, the program proceeds to the step 16 to determine whether or not a predetermined period of time of tFS7 seconds, e.g. 5 seconds, has elapsed. If the step 16 renders a negative answer, the present execution of the program is terminated without executing the step 17 et seq. On the other hand, if the answer to the step 16 is Yes, the step 17 is executed to determine whether or not the sign of the difference between the desired valve opening command value LCMD and the actual valve opening value LACT has been inverted a predetermined number of times nFS7, e.g. 5 times. If the answer to the question of the step 17 is Yes, that is, if it is determined that the sign of the difference has been inverted the predetermined number of times of nFS7 within the predetermined period of time of tFS7 seconds, it is judged that the L sensor 26 is operating normally. Then, the step 7 is executed, followed by termination of the present execution of the program. On the other hand, if the answer to the question of the step 17 is negative, the step 11 is executed. If the step 11 renders a negative answer, the step 12 is executed, thereby completing a first fault detection of the L sensor 26. The present execution of the program is terminated after execution of the step 13 wherein the tFS6 timer is restarted. Then, in the next execution of the present program in synchronism with generation of a subsequent TDC signal pulse, if it is determined that the sign of the difference between the desired valve opening command value LCMD and the actual valve opening value LACT has been inverted the predetermined number of times of nFS7 within the predetermined period of time of tFS7 seconds, it is judged that the operation of the L sensor 26 is normal, as a result of execution of the steps 2, 3, 8, 4, 5, 16, 17 and 7, thereby preventing making a wrong judgement.

On the other hand, if it is determined that the sign of the difference has not been inverted the predetermined number of times of nFS7 within the predetermined period of time of tFS7 seconds from the time the first fault detection was made, the answer to the question of the step 11 will be affirmative. Then, the step 14 is executed to complete the second fault detection. Then, in the next execution of the program in synchronism with generation of a subsequent TDC signal pulse, the step 1 will render an affirmative answer which results in execution of the step 15 wherein the failure display 39 is actuated and at the same time failure compensation operation is executed, followed by termination of the execution of the program.

Although in each of the first and second embodiments, fault detection of the L sensor 26 is prohibited if it is determined, at the step 5, that the desired valve opening command value LCMD is smaller than the predetermined reference value LCMDFS set at the lower limit value indicative of a substantially fully closed position of the EGR valve, this is not limitative, but the program may alternatively be arranged to prohibit the fault detection of the L sensor 26 when the desired valve opening command value LCMD is larger than a predetermined reference value set at an upper limit value indicative of a substantially fully opened position of the EGR valve 16.

What is claimed is:

1. A method of controlling an exhaust gas recirculating quantity in an internal combustion engine having an exhaust passage, an intake passage, and an exhaust gas recirculation control system comprising an exhaust gas recirculating passageway communicating said exhaust passage with said intake passage, an exhaust gas recirculating valve arranged across said exhaust gas recirculating passageway for regulating said quantity of exhaust gases recirculated from said exhaust passage to said intake passage, a valve actuator means for actuating said exhaust gas recirculating valve to open or close, and sensor means for detecting actual valve opening of said exhaust gas recirculating valve, the method being adapted to set a desired valve opening value of said exhaust gas recirculating valve in response to operating conditions of said engine, calculate the difference between said actual valve opening value detected by said valve opening detecting means and said desired valve opening value, and operate said valve actuator means so as to minimize the difference, the method comprising the steps of: (1) detecting a time interval at which the sign of the difference between said actual valve opening value detected by said valve opening sensor means and said desired valve opening value has been inverted; and (2) determining that said exhaust gas recirculation control system has developed an abnormality, if said time interval detected at the step (1) exceeds a predetermined period of time.

2. A method as claimed in claim 1, wherein said valve actuator means comprises a diaphragm operatively connected to said exhaust gas recircuating valve, said diaphragm being displaceable in response to a difference between a pressure acting upon one side surface thereof and a pressure acting upon another side surface thereof, an atmospheric pressure chamber partly defined by said one side surface of said diaphragm, a negative pressure chamber partly defined by said other side surface of said diaphragm, means for introducing atmospheric pressure into said atmospheric pressure chamber, means for introducing a resultant pressure of a pressure within said intake passage and said atmospheric pressure into said negative pressure chamber, and means for regulating said resultant pressure.

3. A method as claimed in claim 2, wherein said resultant pressure-regulating means comprises a first communication passage communicating between said negative pressure chamber and said intake passage, a second communication passage communicating between said first communication passage and the atmosphere, and a resultant pressure-regulating valve arranged across said second communication passage for regulating said resultant pressure.

4. A method as claimed in claim 1, said predetermined period of time is set at a fixed value independent of operating conditions of said engine.

5. A method as claimed in claim 1 or 4, wherein execution of said steps (1) and (2) is prohibited, when said desired valve opening value is set at a value larger than an upper limit value indicative of a substantially fully opened position of said exhaust gas recirculating valve.

6. A method as claimed in claim 1 or 4, wherein execution of said steps (1) and (2) is prohibited, when said desired valve opening value is set at a value smaller than a lower limit value indicative of a substantially fully closed position of said exhaust gas recirculating valve.

7. A method as claimed in claim 1 or 4, including the step of fully closing said exhaust gas recirculating valve, when it is determined that said exhaust gas recirculation system has developed an abnormality at said step (2).

8. A method of controlling an exhaust gas recirculating quantity in an internal combustion engine having an exhaust passage, an intake passage, and an exhaust gas recirculation control system comprising an exhaust gas recirculating passageway communicating said exhaust passage with said intake passage, an exhaust gas recirculating valve arranged across said exhaust gas recirculating passageway for regulating said quantity of exhaust gases recirculated from said exhaust passage to said intake passage, a valve actuator means for actuating said exhaust gas recirculating valve to close or open, and sensor means for detecting actual valve opening of said exhaust gas recirculating valve, the method being adapted to set a desired valve opening value of said exhaust gas recirculating valve in response to operating conditions of said engine, calculate the difference between said actual valve opening value detected by said valve opening detecting means and said desired valve opening value, and operate said valve actuator means so as to minimize the difference, the method comprising the steps of: (1) detecting the number of times the sign of the difference between said actual valve opening value detected by said valve opening sensor means and said desired valve opening value has been inverted within a predetermined period of time; and (2) determining that said exhaust gas recirculation control system has developed an abnormality, if the number of times detected at said step (1) does not reach a predetermined number of times within said predetermined period of time.

9. A method as claimed in claim 8, wherein said valve actuator means comprises a diaphragm operatively connected to said exhaust gas recircuating valve, said diaphragm being displaceable in response to a difference between a pressure acting upon one side surface thereof and a pressure acting upon another side surface thereof, an atmospheric pressure chamber partly defined by said one side surface of said diaphragm, a negative pressure chamber partly defined by said other side surface of said diaphragm, means for introducing an atmospheric pressure into said atmospheric pressure chamber, means for introducing a resultant pressure of a pressure within said intake passage and said atmospheric pressure into said negative pressure chamber, and means for regulating said resultant pressure.

10. A method as claimed in claim 9, wherein said resultant pressure-regulating means comprises a first communication passage communicating between said negative pressure chamber and said intake passage, a second communication passage communicating between said first communication passage and the atmosphere, and a resultant pressure-regulating valve arranged across said second communication passage for regulating said resultant pressure.

11. A method as claimed in claim 8, said predetermined period of time is set at a fixed value independent of operating conditions of said engine.

12. A method as claimed in claim 8 or 11, wherein execution of said steps (1) and (2) is prohibited, when said desired valve opening value is set at a value larger than an upper limit value indicative of a substantially fully opened position of said exhaust gas recirculating valve.

13. A method as claimed in claim 8 or 11, wherein execution of said steps (1) and (2) is prohibited, when said desired valve opening value is set at a value smaller than a lower limit value indicative of a substantially fully closed position of said exhaust gas recirculating valve.

14. A method as claimed in claim 8 or 11, including the step of fully closing said exhaust gas recirculating valve, when it is determined that said exhaust gas recirculation system has developed an abnormality at said step (2).

* * * * *